United States Patent
Schmidt et al.

(10) Patent No.: US 9,740,522 B2
(45) Date of Patent: Aug. 22, 2017

(54) CONTROLLED INTERRUPTION AND RESUMPTION OF BATCH JOB PROCESSING

(71) Applicant: SAP SE, Walldorf (DE)

(72) Inventors: Olaf Schmidt, Walldorf (DE); Martin P. Fischer, Heidelberg (DE)

(73) Assignee: SAP SE, Walldorf (DE)

( * ) Notice: Subject to any disclaimer, the term of this patent is extended or adjusted under 35 U.S.C. 154(b) by 65 days.

(21) Appl. No.: 14/967,739

(22) Filed: Dec. 14, 2015

(65) Prior Publication Data
US 2016/0098293 A1 Apr. 7, 2016

Related U.S. Application Data

(63) Continuation of application No. 12/435,690, filed on May 5, 2009, now abandoned.

(51) Int. Cl.
G06F 9/46 (2006.01)
G06F 9/48 (2006.01)

(52) U.S. Cl.
CPC ............ G06F 9/4818 (2013.01); G06F 9/485 (2013.01)

(58) Field of Classification Search
None
See application file for complete search history.

(56) References Cited

U.S. PATENT DOCUMENTS

| | | | |
|---|---|---|---|
| 5,115,392 A | 5/1992 | Takamoto et al. | |
| 5,168,566 A | 12/1992 | Kuki et al. | |
| 5,872,970 A | 2/1999 | Pickett et al. | |
| 5,881,284 A | 3/1999 | Kubo | |
| 6,205,468 B1 | 3/2001 | Diepstraten | |
| 6,757,897 B1 | 6/2004 | Shi et al. | |
| 7,222,142 B2 | 5/2007 | Fischer et al. | |
| 7,308,565 B2 | 12/2007 | Bystricky | |
| 7,386,586 B1 | 6/2008 | Headley et al. | |
| 7,457,933 B2 | 11/2008 | Pferdekaemper et al. | |
| 7,653,667 B2 | 1/2010 | Pferdekaemper et al. | |
| 7,693,881 B2 | 4/2010 | Fischer et al. | |
| 7,693,890 B2 | 4/2010 | Fischer et al. | |
| 7,707,176 B2 | 4/2010 | Schmidt | |
| 7,756,813 B2 | 7/2010 | Pferdekaemper et al. | |
| 7,756,814 B2 | 7/2010 | Fischer et al. | |
| 7,827,160 B2 | 11/2010 | Kuhr et al. | |
| 7,844,890 B2 | 11/2010 | Schmidt | |
| 7,930,695 B2 | 4/2011 | Chaudhry et al. | |
| 7,975,013 B2 | 7/2011 | Schmidt | |
| 2004/0181793 A1 | 9/2004 | Sakamoto | |
| 2005/0065951 A1 | 3/2005 | Liston et al. | |
| 2006/0101094 A1 | 5/2006 | Fischer et al. | |
| 2006/0129768 A1 | 6/2006 | Pferdekaemper et al. | |
| 2006/0149736 A1 | 7/2006 | Pferdekaemper et al. | |

(Continued)

*Primary Examiner* — Wissam Rashid
(74) *Attorney, Agent, or Firm* — Fish & Richardson P.C.

(57) ABSTRACT

This disclosure provides various embodiments of software, systems, and techniques for controlled interruption of batch job processing. In one instance, a tangible computer readable medium stores instructions for managing batch jobs, where the instructions are operable when executed by a processor to identify an interruption event associated with a batch job queue. The instructions trigger an interruption of an executing batch job within the job queue such that the executed portion of the job is marked by a restart point embedded within the executable code. The instructions then restart the interrupted batch job at the restart point.

18 Claims, 9 Drawing Sheets

(56) References Cited

U.S. PATENT DOCUMENTS

| | | |
|---|---|---|
| 2006/0155704 A1 | 7/2006 | Fischer et al. |
| 2006/0242203 A1 | 10/2006 | Pferdekaemper et al. |
| 2007/0022423 A1 | 1/2007 | Bril et al. |
| 2008/0154977 A1 | 6/2008 | Schmidt |
| 2008/0154994 A1 | 6/2008 | Fischer et al. |
| 2008/0172595 A1 | 7/2008 | Schmidt |
| 2008/0243781 A1 | 10/2008 | Kuhr et al. |
| 2008/0263007 A1 | 10/2008 | Schmidt |
| 2009/0150168 A1 | 6/2009 | Schmidt |
| 2009/0150431 A1 | 6/2009 | Schmidt |
| 2009/0150866 A1 | 6/2009 | Schmidt |
| 2009/0150906 A1 | 6/2009 | Schmidt |
| 2009/0164979 A1 | 6/2009 | Fischer |
| 2010/0131470 A1 | 5/2010 | Schmidt |
| 2010/0287553 A1 | 11/2010 | Schmidt |

FIG. 5A

Job Overview

🔲 🔍 Release  ⊕ 🗔 🔲 Spool   📖 Job log   ⇨ Step   🔲 Application servers

Job overview from: 01.01.2010 at: :: to: 01.01.2010 at: ::
Selected job names: *   Selected user names: *
Scheduled  ✗ Released  ✗ Ready  ✗ Active  ✗ Finished  ✗ Canceled
Event controlled  Event ID:
ABAP program  Program name:

116

| Job | Job Count | Ln | Job CreatedBy | Status | Start date | Start time ▲ | Σ Duration(sec.) | Delay (sec.) Σ | Execu |
|---|---|---|---|---|---|---|---|---|---|
| SWF_XI_DISPATCH | 07552900 | | WF-BATCH | Finished | 01.01.2010 | 07:56:43 | 0 | 14 | bcema |
| 00145EF41CBA02EC898A2C78A2704557 | 07541500 | | JSMITH | Finished | | 07:57:15 | 0 | 15 | bsw60 |
| ARV_BC_XMB_WRP20090402075715 | 07571500 | | JSMITH | Canceled | | | 0 | 0 | bcema |
| TEST | 07561600 | 📋 | MBROWN | Finished | | | 1 | 8 | bsw60 |
| SWF_XI_DISPATCH | 07564300 | | WF-BATCH | Finished | | 07:57:43 | 0 | 14 | bcema |
| 00306E49C9631DDD9BA231DF36E11A03 | 07561500 | | JSMITH | Finished | | 07:58:15 | 0 | 15 | bsw60 |
| ARV_BC_XMB_WRP20090402075815 | 07581500 | | JSMITH | Canceled | | | 0 | 0 | bcema |
| PAK_USAGE_LOG_CHECK_JOB | 07434200 | | TJONES | Finished | | | 2 | 16 | bsw60 |
| TEST | 07571500 | 📋 | MBROWN | Finished | | | 15 | 8 | bcema |
| SWF_XI_DISPATCH | 07574300 | | WF-BATCH | Finished | | 07:58:30 | 1 | 1 | bcema |
| 00145EF41CBA02DCACDAAB6605C34056 | 07541600 | | SWHITE | Finished | | 07:59:15 | 3 | 19 | bsw60 |
| SWWDHEX | 07561500 | | WF-BATCH | Finished | | | 0 | 10 | bsw60 |
| TEST | 07581500 | 📋 | MBROWN | Finished | | 07:59:18 | 1 | 11 | bsw60 |
| SAP_CCMS_DT_SCHEDULER | 07494300 | 📋 | NTHOMAS | Finished | | 07:59:43 | 2 | 23 | bcema |
| SWF_XI_DISPATCH | 07583000 | | WF-BATCH | Finished | | | 0 | 14 | bcema |
| EPM_DAILY_JOB | 08001400 | | LGREEN | Finished | | 08:00:15 | 32 | 15 | bsw60 |

FIG. 5B

*Display Job SWF_XI_DISPATCH*

🔍 Start condition   ⇨ Step   📄 Job details   📖 Job log   📇 Predecessor job   📇 Successor job   👥 Job selection   📇 Own jobs

116

General Data
- Job name: SWF_XI_DISPATCH
- Job class: A
- Status: Finished
- Exec. Target:

[Spool list recipient]

Job start

Planned Start
- Date: 02.04.2010    Time: 07:56:29

Job Frequency
Every Minute

Job steps
1 Step(s) successfully defined

FIG. 5C

CONTROLLED INTERRUPTION AND RESUMPTION OF BATCH JOB PROCESSING

CLAIM OF PRIORITY

This application claims priority under 35 USC §120 to U.S. patent application Ser. No. 12/435,690, filed on May 5, 2009, the entire contents of which are hereby incorporated by reference.

TECHNICAL FIELD

This disclosure relates to job and data processing and, more particularly, to a generic framework for controlled interruption and resumption of batch job processing.

BACKGROUND

A batch job is a computer program or set of programs processed in batch mode. During batch mode, a sequence of commands for execution by an operating system is often listed in a file (often called a batch file, command file, or shell script) or other data structure and is submitted for execution as a single unit. A batch job typically involves reading data from a database, processing the data, and then returning the processed data to the database. Other batch jobs may merely read or collect existing data to prepare reports, generate new data, and so forth. The batch jobs may pertain to a wide variety of applications such as: financial management reports, marketing reports, supply chain management reports, inventory reports, invoice reports, customer account processing, automated system backup, automated data backup, system performance reporting, and the like. The execution of batch jobs may be automated or manually initiated.

Batch jobs may be scheduled according to a variety of criteria including factors such as the date of the batch job request, amount of time and/or processing resources required to execute the request, business requirements, system resources, downtimes, and the like. As a result, batch jobs start times are typically scheduled by administrators using a scheduler taking into account such factors. With such arrangements, end users requiring batch processing (e.g., printing business documents overnight) place a request with an administrator to schedule the processing of a particular batch job. Regardless, batch job requests or executions are often processed through a job scheduler that manages the initiation of the execution.

These batch processes are often characterized by creating significant load on the system resources, which has negative influence on the performance of other tasks running on the same system. Thus, more comprehensive or process-intensive batch jobs are often executed after business hours when system usage is lower to minimize impact to users. For long running jobs a start time can be scheduled easily, but it may be difficult to predict the corresponding end time. The job scheduler may take into account job queues or job priority. For example, a category of jobs may be assigned to a particular queue that concurrently executes a predefined number of jobs. In another example, batch job processing may be prioritized such that higher priority batch jobs are processed prior to batch jobs with lower conflicting priority. Other criteria may be taken into account when prioritizing conflicting batch job requests for execution.

SUMMARY

This disclosure provides various embodiments of software, systems, and techniques for controlled interruption of batch job processing. In one instance, a tangible computer readable medium stores instructions for managing batch jobs, where the instructions are operable when executed by a processor to identify an interruption event associated with a batch job queue. The instructions trigger an interruption of an executing batch job within the job queue such that the executed portion of the job is marked by a restart point embedded within the executable code. The instructions then restart the interrupted batch job at the restart point.

Some implementations may include one or more of the following features. For example, the computer readable medium may further store instructions operable to receive resuming data associated with a batch job when it is interrupted and provide the resuming data to the interrupted batch job at restart. The resuming data can comprise a batch job identifier and a restart point identifier, and the instructions can be operable to store the resuming data in a database and identify the executing batch job among a plurality of executing batch jobs according to a job priority selected from a job execution priority and an interrupt priority. The interruption event can comprise an execution request of a higher priority batch job, whether automatically or manually requested. The restart can be triggered by completion of the higher priority batch job. The instructions can be further operable to identify a second interruption event associated with the batch job queue, trigger a second interruption of the executing batch job within the job queue such that the executed portion of the batch job is marked by a second restart point, and restart the interrupted batch job at the second restart point, identify a second interruption event associated with the batch job queue, trigger a second interruption of a second executing batch job within the job queue such that the executed portion of the second batch job is marked by a second restart point, and restart the interrupted second batch job at the second restart point. The interrupted batch job can comprise a business application injected with an interrupt framework, with the instructions being further operable to register the business application via the interrupt framework. The registration can comprise an optional flag that is set at execution time via the framework. In some configurations, the instructions comprise a portion of a batch job scheduler managing a plurality of job queues.

The details of these and other aspects and embodiments of the disclosure are set forth in the accompanying drawings and the description below. Other features, objects, and advantages of the various embodiments will be apparent from the description and drawings, as well as from the claims.

DESCRIPTION OF DRAWINGS

FIGS. 5A-C illustrate example graphical user interfaces for job scheduling within a particular implementation of the present disclosure;

DETAILED DESCRIPTION

This disclosure generally describes for controlled interruption of batch job processing. More specifically, this disclosure functionality for interrupting and resuming background jobs at arbitrary point in time. As such, the present disclosure describes systems and computer implemented software embodying techniques that provide the possibility to interrupt the job at a certain point in time to free the system resources and to subsequently continue processing at the point where the application was interrupted. For example, a customer could be executing a large invoice printing job that is running over night. In the morning, when resources are needed for dialog processing, the job is interrupted and restarted later in the evening for the remaining invoices. In certain configurations, this functionality can be implemented as a generic framework, which can provide its interruption service to any application containing background processing.

Figure 1A:
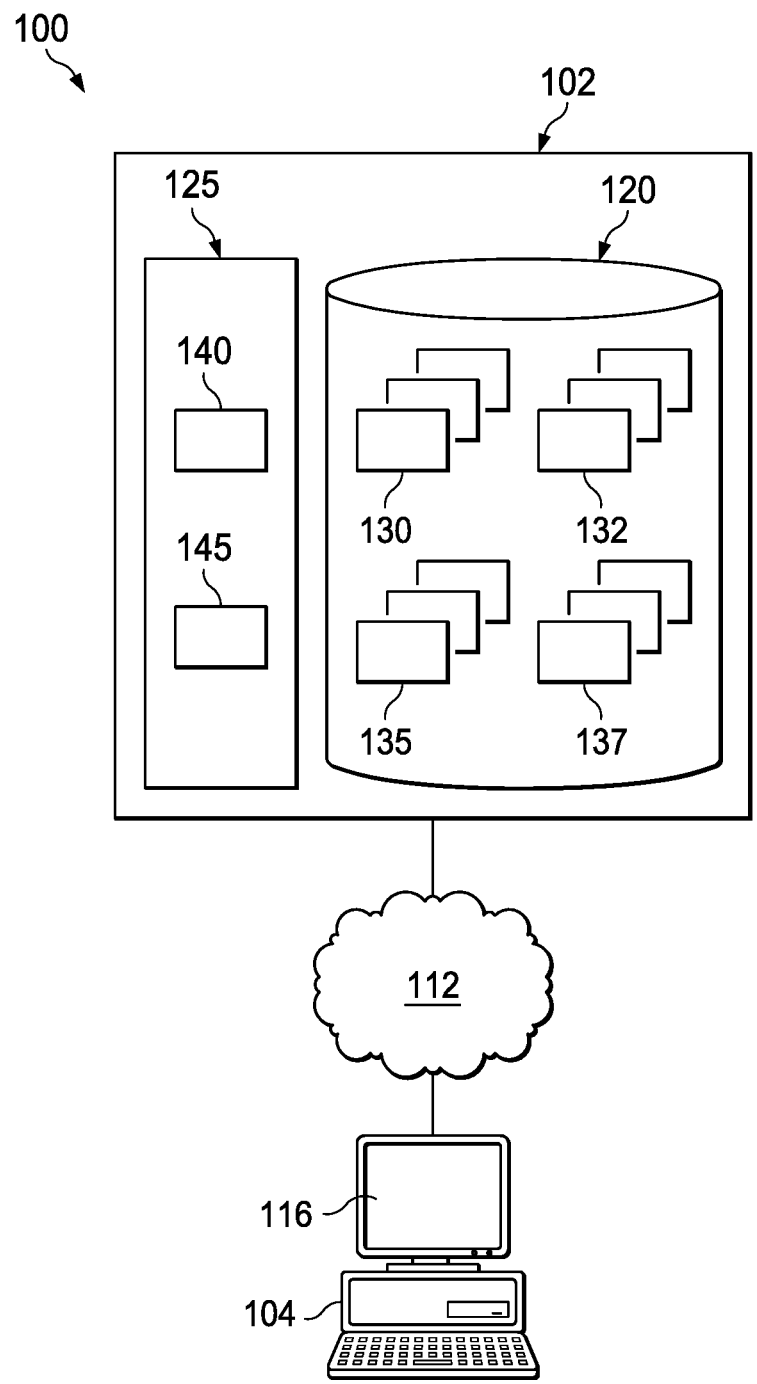
FIGS. 1A-B illustrate an example environment implementing various features of job scheduling management within the context of the present disclosure.
Figure 1B:
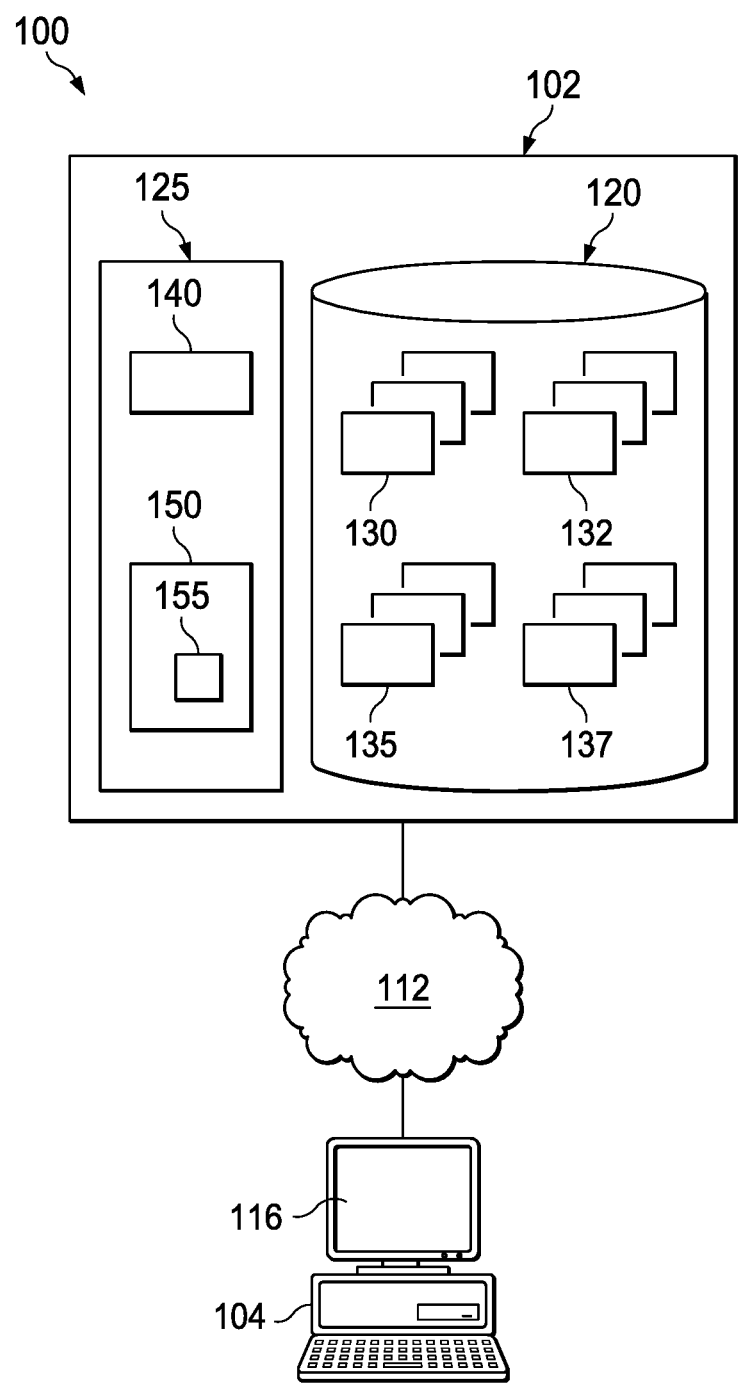

Turning to the illustrated example, the business environment 100 includes or is communicably coupled with server 102 and one or more clients 104, at least some of which communicate across network 112. At a high level, FIG. 1A illustrates an example business environment 100 configured to implement job scheduling processes within the scope of this disclosure and FIG. 1B illustrates an example business environment 100 configured to develop applications or jobs capable of implementing these processes. Although any environment or system may include some, all, as well as other components from one or both of FIGS. 1A and 1B (collectively, FIG. 1).

Server 102 comprises an electronic computing device operable to receive, transmit, process and store data associated with environment 100. FIG. 1 merely provides examples of computers and configurations that may be used with the disclosure. Each computer is generally intended to encompass any suitable processing device that stores and or executes instructions. For example, although FIG. 1 illustrates one server 102 that may be used with the disclosure, environment 100 can be implemented using computers other than servers, as well as a server pool. Indeed, server 102 may be any computer or processing device such as, for example, a blade server, general purpose personal computer (PC), Macintosh, workstation, Unix-based computer, or any other suitable device. In other words, the present disclosure contemplates computers other than general purpose computers as well as computers without conventional operating systems. Server 102 may be adapted to execute any operating system including Linux, UNIX, Windows Server, or any other suitable operating system. According to one embodiment, server 102 may also include or be communicably coupled with a web server.

The illustrated server 102 includes one or more processors 125. The processor 125 may be a central processing unit (CPU), a blade, an application specific integrated circuit (ASIC), or a field-programmable gate array (FPGA). The processor 125 may execute instructions and manipulate data to perform the operations of server 102. Although FIG. 1 illustrates one processor 125 in server 102, only one or more than one processor may be used according to particular needs or desires of environment 100. In the illustrated embodiment, processor 125 executes or interfaces with software, such as the business application 140, job scheduler 145, development application 150, interruption framework 155, reporting module, or other software. Regardless of the particular implementation, "software" may include any computer-readable instructions embodied on tangible medium including executable code, firmware, wired or programmed hardware, or any combination thereof as appropriate such that it is stored on tangible medium and operable to be executed. Indeed, each software component may be fully or partially written or described in any appropriate computer language including C, C++, Java, Visual Basic, assembler, Perl, any suitable version of 4GL, as well as others. It will be understood that while the application illustrated in FIG. 1 is shown as an individual module that implements the various features and functionality through various objects, methods, or other processes, the application may instead include a number of sub-modules, third-party services, components, libraries, and such as appropriate. Conversely, the features and functionality of various components can be combined into single components as appropriate.

The server 102 includes a business application 140. In some instances, a business application may execute or provide a number of application services, including customer relationship management (CRM) systems, human resources management (HRM) systems, financial management (FM) systems, project management (PM) systems, knowledge management (KM) systems, and electronic file and mail systems. The business application may be operable to exchange data with a plurality of enterprise-based systems and, in the process, update or modify one or more content repositories. The various services performed may allow the business application to orchestrate one or more business processes in synchronization with other processes that directly or indirectly affect the information stored within one or more of the content repositories. For instance, the business application may drive business processes across different applications, systems, technologies, and organizations, thus driving end-to-end business processes across heterogeneous systems or sub-systems. The business application 140 can be, for example, a pricing update, inventory interface, sales order processor, or any other business application. In another example, the application 140 may instead be some or all of an operating system that allows for running applications to be cleanly interrupted and restarted.

The business application 140 can often be, include, produce, and/or request execution of batch jobs via a job scheduler 145. In some situations, the application 140 implements an interruption interface provided by an interruption service framework 155. This interface provides information for the framework regarding the resuming point of the applications. The framework persists this information and utilizes it to resume the job at a later point in time. For example, the application can implement interfaces of the interruption framework in order to react on the resuming request. The received resuming data can be interpreted, parsed, or otherwise processed such that the application is initialized accordingly. As such, this interface can be utilized by the framework to interrupt a running job on demand (whether interactively or scheduled) or as needed (such as due to processing capability, critical job, load, time to completion, etc.), as well as cleanly resume the interrupted job.

Figure 2:
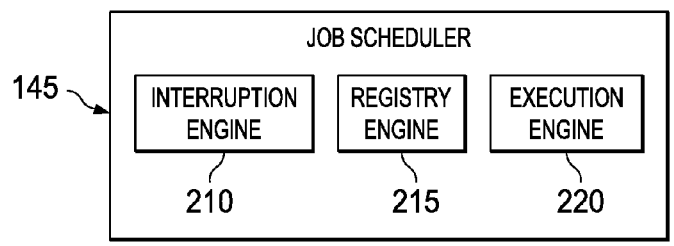
FIG. 2 illustrates an example high level configuration of a job scheduler for use by an appropriate system, such as the system described in FIG. 1.
Figure 3:
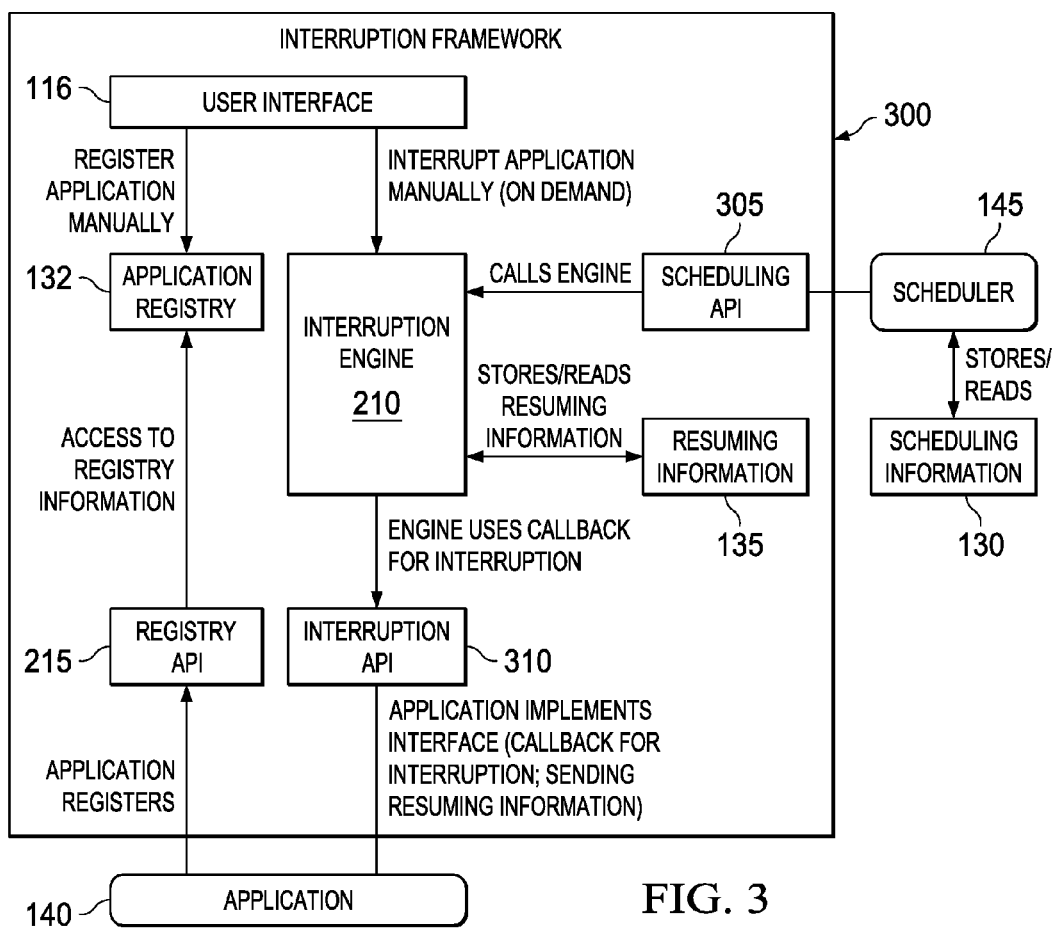
FIG. 3 illustrates a more detailed example of an interruption framework for use by an appropriate system, such as the system described in FIG. 1.

Job scheduling may be performed via the job scheduler 145, or any other appropriate application programmed scheduling or via a generic scheduling UI. As shown in more example detail in FIG. 3, FIG. 2 illustrates one configuration of job scheduler 145. Specifically, job scheduler 145 may include an interruption engine 210, a registry engine 215, and an execution engine 220. Job release and resource control may be performed by a local expert or key user having a local "Application Management Work Center" or by the overall system administrator having an "ITSAM Work Center." In some implementations, batch job execution may include a mass printing of invoices at night. Printing will be realized via output management. Print attributes may be accessed via a "Parameter Service" of an Output Management and a system-wide override for each usage. Printing may be realized by agent technology (e.g., specific print parameters might be set in the agent). Another printing technique may be realized through direct call of Output Management APIs (e.g., specific print parameters might be set in the coding). Thus, the need to set print parameters may not exist on job level.

In one aspect, scheduling batch jobs involves receiving a plurality of requests for batch jobs in which each batch job corresponds to one of a plurality of batch job categories. The batch job categories define certain types of batch jobs. The categories may be defined by a system administrator based on any criteria that may be used to differentiate batch job types. In some variations of the subject, the administrator may define special batch jobs that represent the batch job categories (e.g., one batch job per category). In addition, the administrator may schedule these special batch jobs at different times (e.g., time slots associated with the batch job category). For example, batch jobs that require lengthy processing might be associated with one batch job category so that they may be processed during off-hours. Batch jobs that require short processing might be placed into another batch job category so that they may be processed during short intervals during peak usage hours. Scheduling batch jobs may further comprise defining the plurality of batch job categories. Optionally or in addition, the method may comprise assigning one or more time slots for each of the plurality of batch job categories. The time slots may be recurring or they may be identified based on system parameters such as processing consumption levels. The batch job processing may also include authenticating the requests. The authentication may be used to verify that requests are originating from authorized network nodes and/or individuals on these network nodes.

Each batch job category can have one or more time slots assigned to it. The time slots may be recurring or they may be triggered based on processing consumption. For example, a time slot may be 1:15 am to 1:23 am every day. Alternatively, a time slot may be defined as any time during a predefined period in which processing consumption is below a certain level. During these time slots, batch jobs such as message broadcasting, printing requests, web site log analyses, and the like may occur. In some variations, a user may first select a batch job category when generating a batch job request. In other variations, a batch job category is assigned after the actions to be taken by a batch job are specified by a user.

In some variations, a load on a system is monitored during one or more of the time slots. The monitored load may be used to provide historical data useful for scheduling batch jobs during certain time slots. In one variation, the processing processes each batch job during one or more of the selected time slots in which the load on the system is below a predetermined threshold. Load on the system may be monitored continually and/or during the time slots. The load monitoring data can be used to make determinations on when to assign time slots and which batch jobs requests to handle/process within a particular requested time slot. For example, if a batch job request selects three time slots, the historical load data may be known for each of these slots. Therefore, a determination may be made taking into account average load when determining when to process the corresponding batch job (i.e., the batch job may be processed during the time slot with the lowest historical load).

Measures may be incorporated to ensure that received batch job requests are from authorized users. Passwords, IP address authentication, and similar techniques may be used to confirm the identify of a node, component, or user issuing a request. If numerous requests are received for the same time slots, the requests may be processed according to a priority ranking. The requests may be assigned priority designations based on criteria such as origination of requests, category of request (in case multiple request categories utilize overlapping time slots), load levels, and the like.

Figure 4:
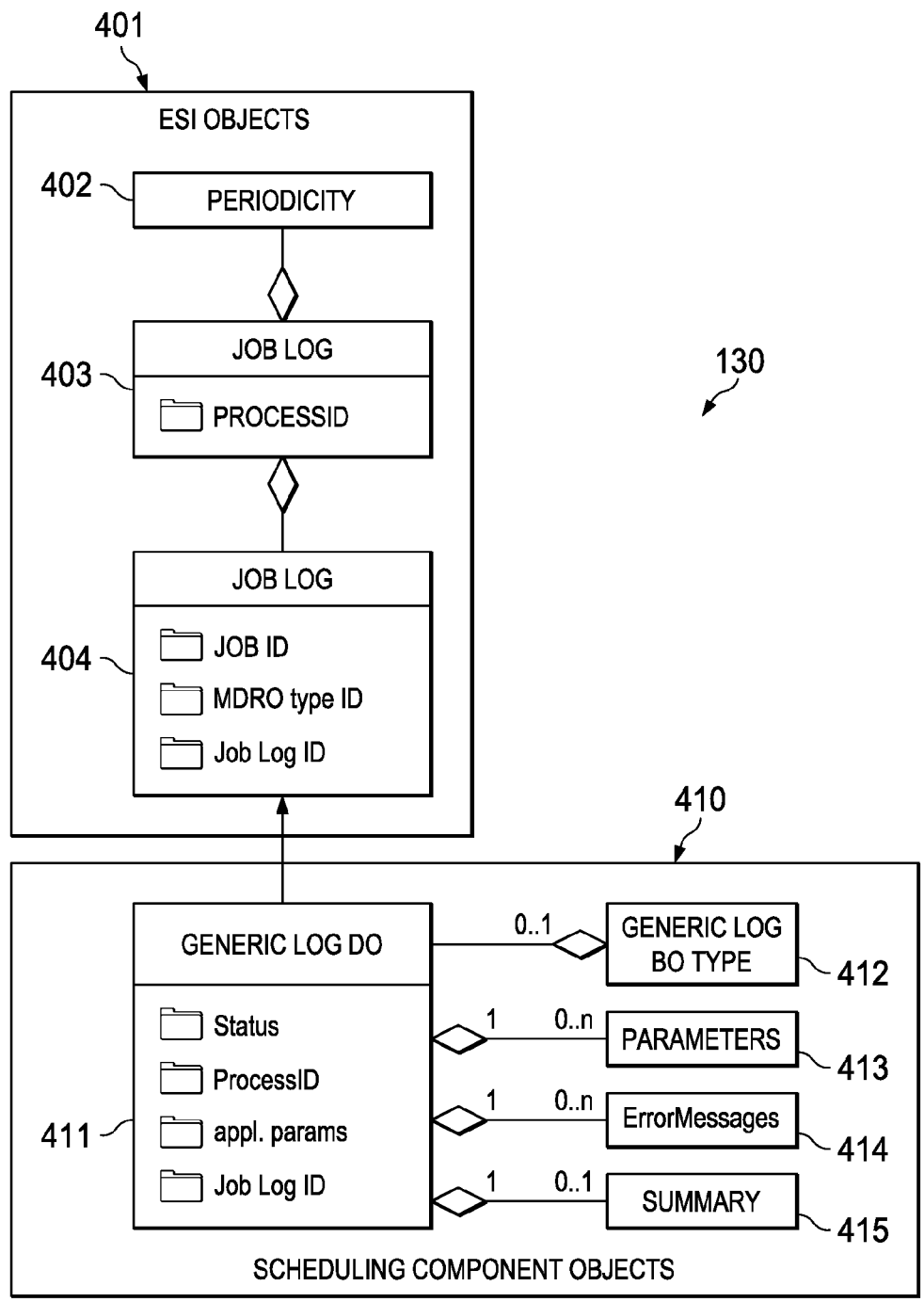
FIG. 4 illustrates an example data schema used for job scheduling management within the context of the present disclosure.

Batch jobs can be defined by job definitions 130, storing parameters or execution flags, stored in memory 120. Memory 120 represents any memory or database module and may take the form of volatile or non-volatile memory including, without limitation, magnetic media, optical media, random access memory (RAM), read-only memory (ROM), removable media, or any other suitable local or remote memory components. As such, illustrated memory 120 can also store an interruption registry 132, a persistency layer 135 for job information, and business data 137. Memory 120 may also include any other appropriate data such as data classes, object interfaces, unillustrated software applications or sub-systems, and so on. For example, as illustrated in more example detail in FIG. 4, memory 120 may store ESI component objects 401 and scheduling component objects 410 to facilitate management of job scheduling. Specifically, ESI components may include a periodicity object 402, a job log object 403 storing a process ID, and a job log object storing a job ID, a mass data run object (MDRO) type ID, and a job log ID. The example scheduling component objects 410 may include a generic log data object 411, a generic log business object type 412, zero or more parameters 413, zero or more error messages 414, and a summary object 415.

Returning to the illustrated components, interruption registry 132 stores registration information for applications to be considered for background job interruption and resuming. The registration information may include a job identifier, an associated user, an application, target data, location, a category, a priority, or any other information that can be sued to uniquely identify registration of an instance of a job (perhaps using parent-child inheritance, such as "all jobs executed for a particular application"). Using this registry 132, application 140 can register for the interruption service in background processing framework. In this example, the interruption service may only be provided for registered application programs 140. The interruption service allows the job scheduler to trigger interruption and restart events by user interaction or by events stored in the job framework. This registration process can occur during application development, job creation, job execution, and so on.

This framework can be injected or embedded, whether hard-coded or utilizing dynamic linking, into business application 140 using development environment 150. Within example development environment 150, an application can be developed (created or modified) using coding or modeling systems. Developers may use environment 150 to draft source code, compile various files for applications, libraries, and such, modify or inject frameworks, or other software development. In general, models can specify the types of development objects or components that can be used to build applications, as well as the relationships that can be used to connect those components. In a given modeled architecture, development objects can be organized by any combination of relationships, including hierarchical relationships, grouping relationships, and the like. In an object-oriented architecture, for example, a defined application can include a combination of various data objects and resources (i.e., development objects). In that example, relationships among the development objects can include a relationship indicating that one data object inherits characteristics from another data object. Applications built using the model-view-controller (MVC) architecture typically include three different types of components—models, which store data such as application data; views, which display information from one or more models; and controllers, which can relate views to models, for example, by receiving events (e.g., events raised by user interaction with one or more views) and invoking corresponding changes in one or more models. When changes occur in a model, the model can update its views. Data binding can be used for data transport between a view and its associated model or controller. For example, a table view (or a table including cells that are organized in rows and columns) can be bound to a corresponding table in a model or controller. Such a binding indicates that the table is to serve as the data source for the table view and, consequently, that the table view is to display data from the table. Continuing with this example, the table view can be replaced by another view, such as a graph view. If the graph view is bound to the same table, the graph view can display the data from the table without requiring any changes to the model or controller. In the MVC architecture, development objects can include models, views, controllers, and components that make up the models, views, and controllers. For example, application data in a model can be an example of a component that is a development object.

Persistence layer 135 stores restart points and other resuming information of interrupted batch jobs. For example, the persistence layer may be a cache or a database that is capable of storing information that facilitates the clean restarting of interrupted jobs at the point of termination. This resuming information may include a unique job identifier, a restart part identifier, and any other data that facilitates this restart, such as assigned job queue, category, processing time elapsed, interruption time elapsed, estimated time to completion, job queue, runtime priority, and so forth. In some configurations or situations, this resuming information may be analyzed for multiple jobs to determine the appropriate interrupted job to restart, perhaps based on priority, length of interruption, etc.

Many of the example batch jobs operate on business data 137. Example business data 137 can include pricing changes, invoices, sales orders, vendor information, accounts, customers, financial transactions, or any other business transactional data that may have some processing performed on it by business application 140, such as creating, printing, reading, updating, closing, archiving, and so forth. Business data 137 may be formatted, stored, or defined as various data structures in a Service Oriented Architecture (SOA) utilizing business and data objects, relational database tables, eXtensible Markup Language (XML) documents, text files, Virtual Storage Access Method (VSAM) files, flat files, Btrieve files, comma-separated-value (CSV) files, internal variables, one or more libraries, or any other format capable of storing or presenting all or a portion of the interface, process, data, and other models or modeling domains.

The network 112 facilitates wireless and/or wireline communication between the server 102 and any other local or remote computer, such as the client 104. The network 112 may be all or a portion of an enterprise or secured network. In another example, a portion of network 112 may be a virtual private network (VPN) merely between the server 102 and the client 104 across a wireline or wireless link. Such an example wireless link may be via 802.11a, 802.11b, 802.11g, 802.20, WiMax, and many others. In another example, 112 106 may include an intranet and the internet. In other words, the network 112 encompasses any internal or external network, networks, sub-network, or combination thereof (whether physical or logical) operable to facilitate communications between various computing components in the system. The network 106 may communicate, for example, Internet Protocol (IP) packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, the network 112 may be a secure network associated with the enterprise and certain local or remote archives, source code repositories, databases, or clients.

Client 104 is any computing device operable to connect or communicate with server 102 or network 112 using any communication link. At a high level, each client 104 can include or execute GUI 116 and comprises an electronic computing device operable to receive, transmit, process and store any appropriate data associated with environment 100, typically via one or more applications such as business application 140. It will be understood that there may be any number of clients 104 communicably coupled to server 102. Further, "client 104" and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers. As used in this disclosure, client 104 is intended to encompass a personal computer, touch screen terminal, workstation, network computer, kiosk, wireless data port, smart phone, personal data assistant (PDA), one or more processors within these or other devices, or any other suitable processing device. For example, client 104 may be a PDA operable to wirelessly connect with external or unsecured network. In another example, client 104 may comprise a laptop that includes an input device, such as a keypad, touch screen, mouse, or other device that can accept information, and an output device that conveys information associated with the operation of server 102 or clients 104, including digital data, visual information, or GUI 116. Both the input device and output device may include fixed or removable storage media such as a magnetic computer disk, CD-ROM, or other suitable media to both receive input from and provide output to users of clients 104.

Figure 5C:
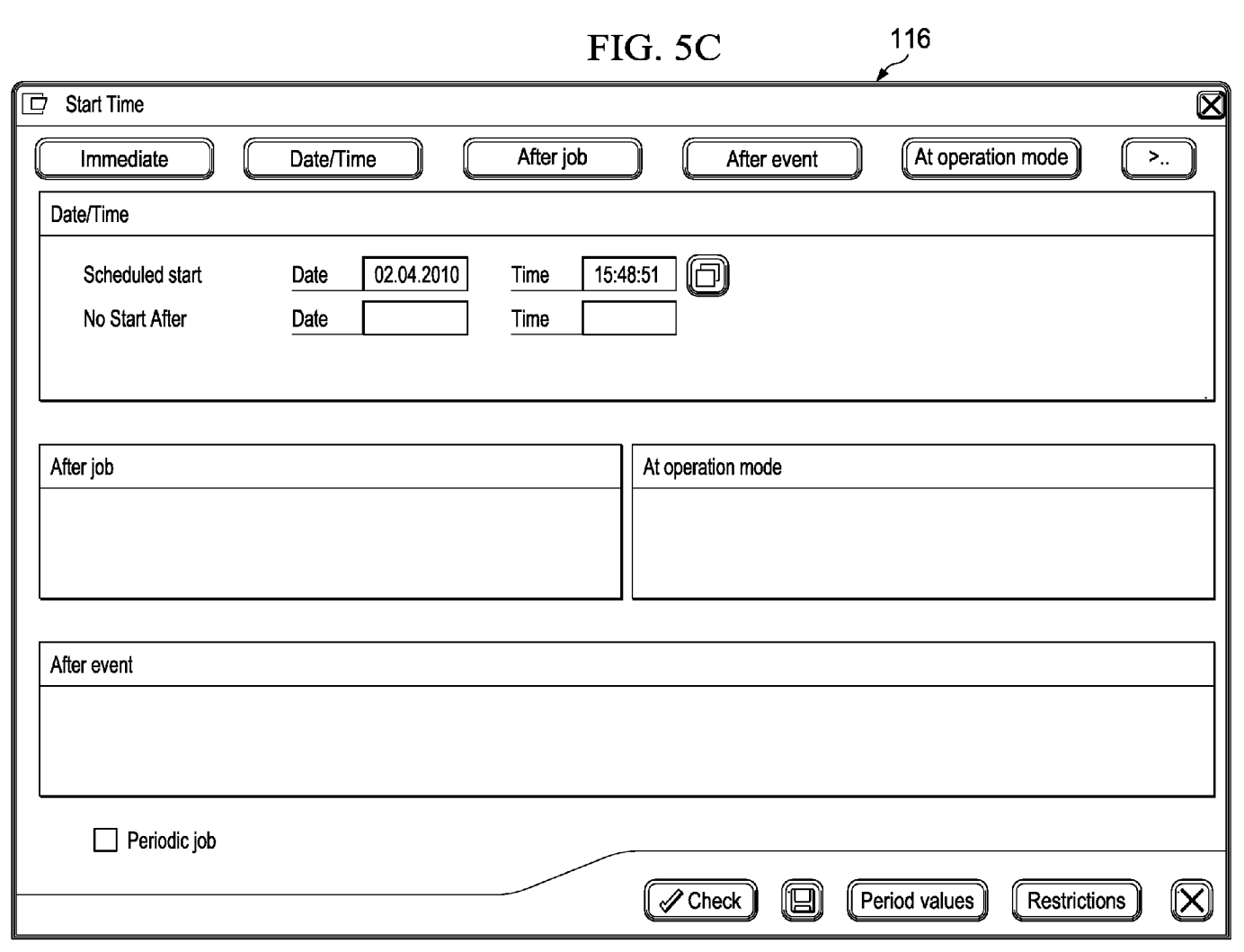

GUI 116 comprises a graphical user interface operable to allow the user of client 104 to interface with at least a portion of environment 100 for any suitable purpose, such as viewing application, reporting, or analytic data. Generally, GUI 116 provides the particular user with an efficient and user-friendly presentation of data provided by or communicated within environment 100. More specifically, GUI 116 can be the front-end or administrator view of business application 140 or job scheduler 145. For example, as shown in FIGS. 5A-C, a user (perhaps authenticated) can submit batch job requests using GUI 116. More specifically, as shown in example FIGS. 5A-C, GUI 116 may be used to manage batch job definitions, scheduling, results, and other batch job management. In another example, GUI 116 may present an interface for running and displaying reports.

In some cases, GUI 116 may comprise a web browser that includes a plurality of customizable frames or views having interactive fields, pull-down lists, and buttons operated by the user. GUI 116 may also present a plurality of portals or dashboards. It should be understood that the term "graphical user interface" may be used in the singular or in the plural to describe one or more graphical user interfaces and each of the displays of a particular graphical user interface. Indeed, reference to GUI 116 may indicate a reference to the front-end or a component of any application or software, as well as the particular interface accessible via client 104, as appropriate, without departing from the scope of this disclosure. Therefore, GUI 116 contemplates any graphical user interface, such as a generic web browser or touch-screen, that processes information in environment 100 and efficiently presents the results to the user. Server 102 can accept data from client 104 via the web browser (e.g., Microsoft Internet Explorer or Mozilla Firefox) and return the appropriate HTML or XML responses to the browser using network 106.

In one aspect of operation, an application program 1040 is started by the job scheduler 145 under a unique job identifier. During execution, the application program 140 listens to interruption events via an implemented interface of the interruption service framework. When appropriate, the interruption service framework triggers an interruption such as by user interactions or by scheduled interruption events. If the triggered interruption event is received by the background job of a registered application program 140, it continues processing until it reaches a consistent state or the next restart point. The application program 140 can then pass its resuming conditions to the interruption service framework by means of an implemented interface. The interruption service framework stores the resuming conditions together with the unique job identifier for the interrupted job in its persistence layer 135. As such, the application program can cleanly terminate mid-processing such that it can restart at that intra-processing point. When appropriate, the application program 140 can be restarted by the interruption service framework by user interaction or a scheduled restart event. This application background process is started based on the corresponding persisted resuming conditions. The resumed background job of the application program 140 continues until its final termination or the next interruption.

To accomplish this functionality, job scheduler 145 may comprise or be coupled with a plurality of components, including an example interruption framework 300 as shown in FIG. 3. Here, the decoupled interruption framework 300 facilitates interruption communications between the job scheduler 145 and business application 140. As such, the generic framework 300 may expose a scheduling application programming interface (API) 305 to the job scheduler and a registry API 215 and interruption API 310 to the business application. As such, job schedulers 145 provided by customers or third parties may be tailored to incorporate or otherwise utilize this interruption capability. Moreover, disparate business applications 140, whether developed in-house using development environment 150 or provided by a software vendor, can be customized so that they may be optionally interrupted. As shown in FIG. 3, the generic interruption framework further includes or references a user interface 116, the application registry 132, the interruption engine 210, and a persistence layer 135 for storing resuming information.

Figure 6:
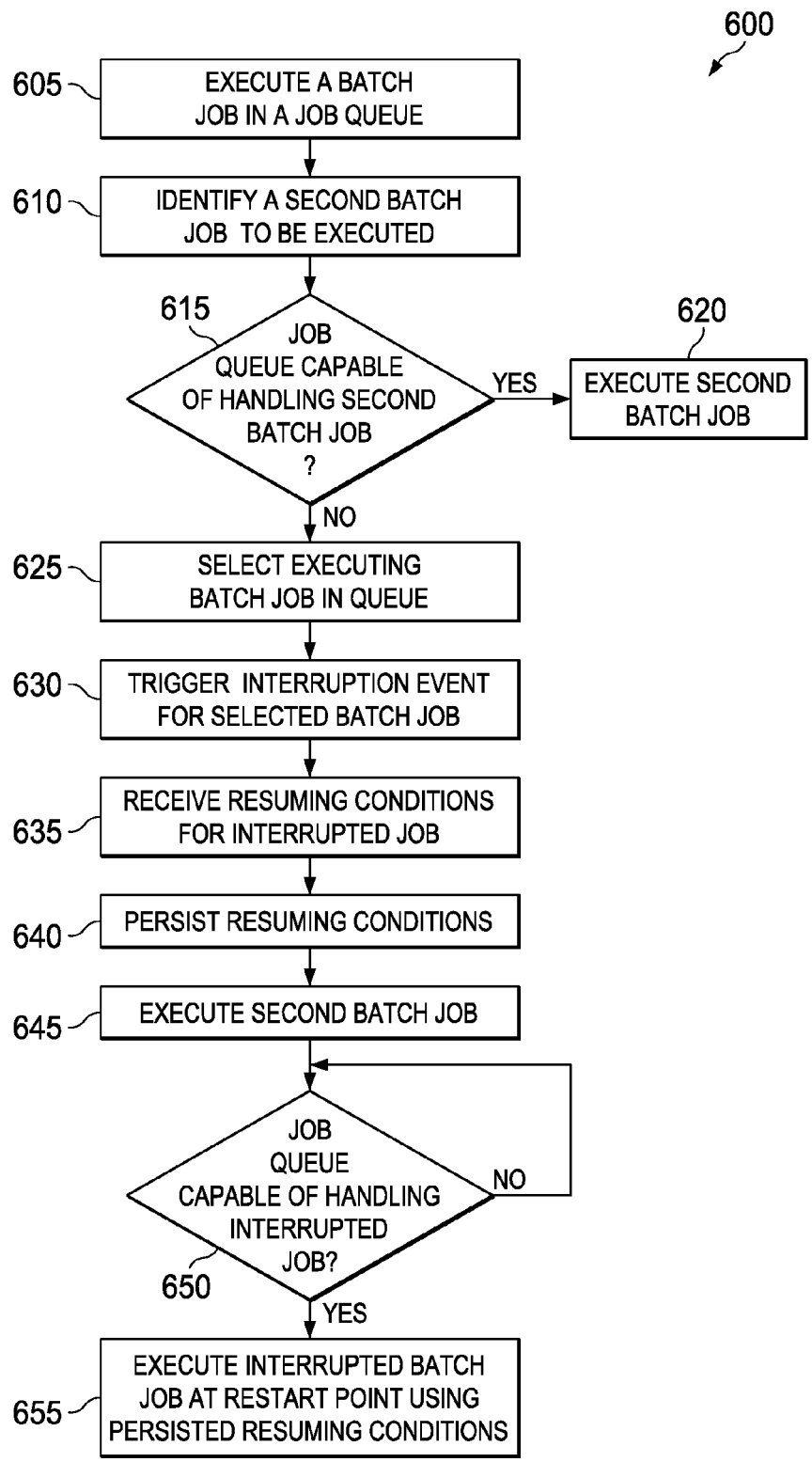
FIG. 6 illustrates an example flowchart depicting one computer implemented process for controlled interruption of batch job processing within a particular implementation of the present disclosure.

Using this or other suitable configurations, job scheduler 145, and interruption framework 300, may implement one computer implemented process 600 for controlled interruption of batch job processing such as that illustrated in example FIG. 6. Specifically, computerized method 600 begins at step 605, where job scheduler 145 executes a batch job in a job queue often using a job definition 130. The execution may be based on a manual request submitted via GUI 116, requested via business application 140, or previously scheduled and it may be associated with an execution priority. While job queues may not be utilized in every configuration, if used, this job queue may automatically selected or assigned based on a job category as appropriate. In another words, reference to a "job queue" includes those situations where a batch job processing system utilizes a single queue (even if not uniquely identified) or does not utilize queues to categorize or manage multiple batch jobs. Moreover, any number of jobs may already be executing within the system or the particular job queue.

Next, at step 610, the job scheduler identifies a second batch job to be executed. The job scheduler 145 determines if the job queue (or, more generally, the job processing system) is currently capable of handling or otherwise processing the second batch job at decisional step 615. This determination may be based on priority limitations (e.g., only one "critical" job running at a time), schedule limitations (e.g., print jobs much only run at night), business limitations (e.g., only one journal entry or period closing job running at a time in this queue), processing limitations (e.g., computation of network roundtrips, processing power, memory limitations, and job queue limitations), or any other appropriate criteria. If the example job queue can handle the second batch job, then it is executed at step 620.

But if the job queue is unable to currently process the second batch job, then one or more jobs may be interrupted to make room for the job if desired. As illustrated, the job scheduler (or interruption framework 300) selects one or more jobs that are currently executing at step 625. This selection may be based on job priority (whether an execution priority or an interruption priority), processing power or memory needed by the second job and being utilized by the executing jobs, or based on any other of the limitations identified above. In another example, this selection may utilize the interruption registry to identify those jobs that are capable of, or optionally flagged for, interruption. Once the executing job is selected or otherwise identified, then the job scheduler 145 triggers an interruption event for that job (or jobs) at step 630. This triggers the controlled interruption of the batch job and receipt of the resuming conditions for that interrupted job at step 635. This resuming information may include a job identifier, a restart point, or any other data to assist or otherwise facilitate the clean execution of the interrupted job at that intra-process point. The resuming conditions can then be persisted in persistence layer 137, which is perhaps a database, at step 640. At this point, assuming that the respective limitations are removed via the interruption of other batch jobs, the second batch job is executed at step 645.

The job scheduler 145 can then continue to monitor the job queue for openings for the one or more interrupted jobs, as shown by decisional step 650. Once an opening is identified, the job scheduler 145 may select one or more of the "on hold" jobs for execution at step 655. This selection may be based on a comparison between job needs and job queue capability, job priority, time elapsed since interruption, or any other suitable criteria.

Figure 7:
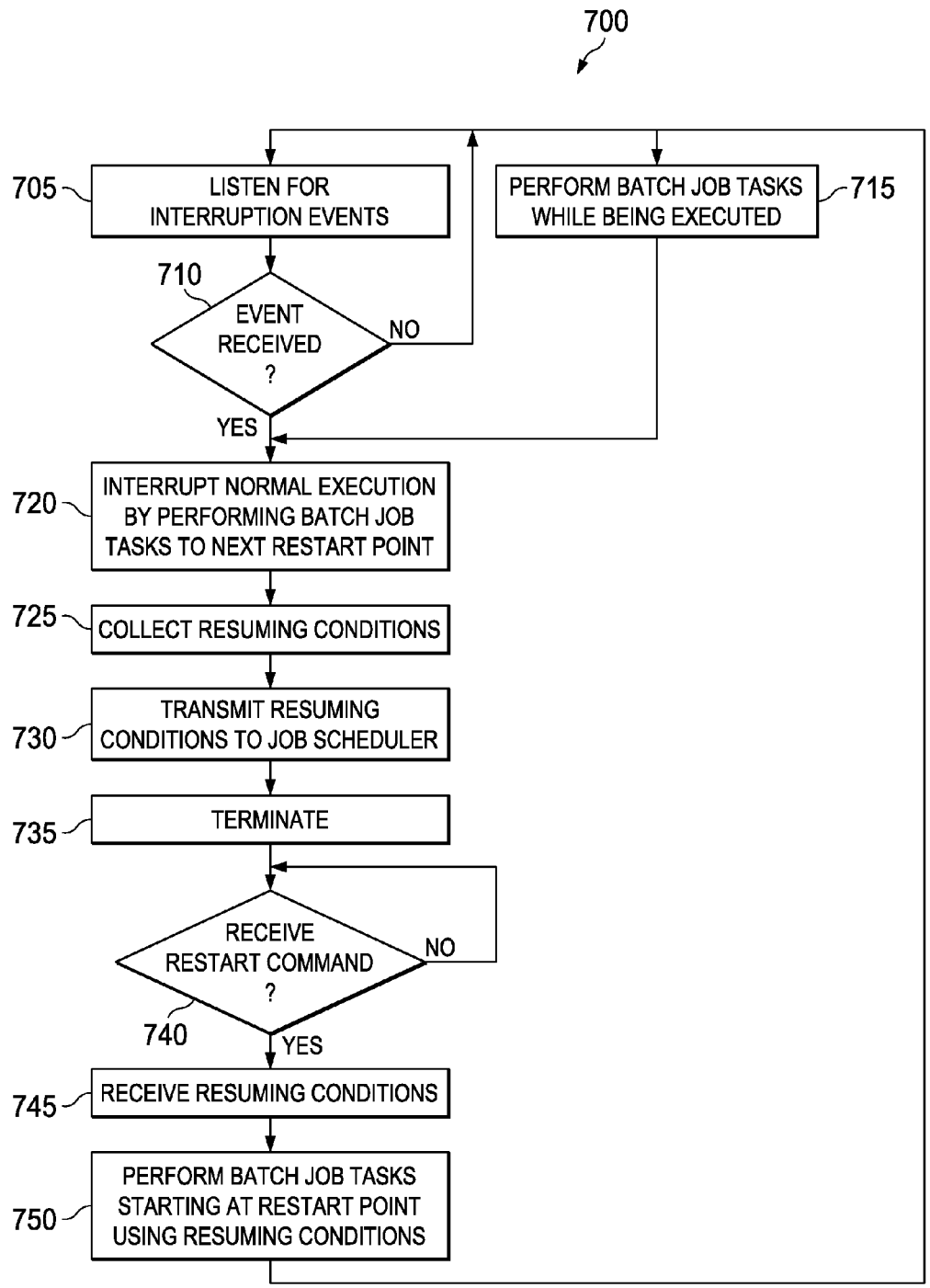
FIG. 7 illustrates an example flowchart depicting another computer implemented process for controlled interruption of batch job processing within a particular implementation of the present disclosure.

In another example, business application 140, and interruption framework 300, may implement one computer implemented process 700 for controlled interruption of batch job processing such as that illustrated in example FIG. 7. In this example, method 700 (relatively concurrently) involves execution of the respective batch job at step 715 and implementation of a listener for interruption events at step 705. Typically, the execution may occur first and the listener agent initiation shortly thereafter. Regardless, both steps are typically executing concurrently. Once an interruption event is received, as shown by decisional step 710, the application 140 interrupts normal execution at step 720. This interruption may not involve an actual "interruption" of processing, but instead sets a flag, variable, or other trigger that helps ensure that the executing application terminates at the next available restart point in a controlled fashion. These restart points may be placed at appropriate logical locations within the logic of the application by developers so that various tasks within the job are completed without interruption, while still allowing the program to be cleanly terminated intra-processing. As such, the batch job is executing on processor 125 when it determines the appropriate stopping point. Once the next restart point is reached, the application 140 collects the resuming conditions at step 725. Next, at step 730, this information is transmitted to the job scheduler for persistence and subsequent usage. Then, the job terminates, thereby opening up processing for another batch job.

At some later point, if desired or appropriate, the interrupted job can be restarted at the intra-processing restart point without having to restart the batch job from the beginning. For example, technique 700 illustrates that a restart command may be issued by the job scheduler 145 (or interruption framework 300) and received by the application 140 at step 740. Once the command is received, the batch job collects the resuming conditions, often from the persistence layer 137, at step 745 and resumes processing at the restart point at step 750.

The preceding figures and accompanying description illustrate processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. Moreover, environment 100 may use processes with additional steps, fewer steps, and/or different steps, so long as the methods remain appropriate. For example, the processing may be confined to particular job queues or may automatically manage jobs across job queues, including reassigning a first batch job request to a job queue that includes an executing batch job capable of being interrupted for the first batch job. In another example, the job scheduler 145 (or interruption framework 300) may again determine if the queue is capable of handling the second batch job (at decisional step 615) after a first job is interrupted to ensure no jobs have otherwise been executed that may affect the determination. In yet another example, the job scheduler 145 may place the queue "on hold" to keep other jobs from being executed while this interruption processing is occurring.

In other words, although this disclosure has been described in terms of certain implementations and generally associated techniques and processes, alterations and permutations of these implementations, techniques, and processes will be apparent to those skilled in the art. As such, other implementations are within the scope of the following claims.

What is claimed is:

1. A non-transitory computer readable medium storing instructions for managing batch jobs, the instructions operable when executed by a processor to:
   execute a first batch job within a job queue, the first batch job including one or more tasks, the first batch job comprising a business application injected within an interrupt framework;
   registering the business application via the interrupt framework, the registration comprising an indicator that is set at execution time via the interrupt framework;
   identify a restart point that is placed at a predetermined location included by the first batch job prior to execution of the first batch job;
   identify, while the first batch job is executing, a second batch job to be executed;
   trigger an interruption event of the first batch job within the job queue;
   in response to the interruption event, continue a complete execution of a currently executing task for the first batch job without interruption until the restart point is reached and terminates when the restart point is reached;
   execute the second batch job when the first batch job has terminated; and
   restart the first batch job at the restart point when the second batch job has executed.

2. The computer readable medium of claim 1, the instructions further operable to:
   receive resuming data associated with the first batch job when the first batch job is interrupted; and
   provide the resuming data to the first batch job when the first batch job is restarted.

3. The computer readable medium of claim 2, the resuming data comprising a batch job identifier and a restart point identifier.

4. The computer readable medium of claim 2, the instructions further operable to store the resuming data in a database.

5. The computer readable medium of claim 1, the instructions further operable to identify the second batch job from among a plurality of batch jobs according to a job priority.

6. The computer readable medium of claim 5, wherein the job priority is at least one of a job execution priority or an interruption priority.

7. The computer readable medium of claim 1, wherein the second batch job is a higher priority batch job than the first batch job, and wherein the interruption event comprises an execution request of the higher priority batch job.

8. The computer readable medium of claim 1, wherein the first batch job has a larger load level than the second batch job.

9. The computer readable medium of claim 1, wherein the second batch job includes a second restart point, and wherein the instructions further operable to:
    identify a third batch job to be executed while the second batch job is executing;
    trigger a second interruption event of the second batch job within the job queue such that the second batch job executes until the second restart point is reached and terminates when the second restart point is reached;
    execute the third batch job when the second batch job has terminated; and
    restart the second batch job at the second restart point when the third batch job has terminated.

10. The computer readable medium of claim 1, wherein the second batch job includes a second restart point, and wherein the instructions further operable to:
    receive a request to restart the first batch job;
    trigger a second interruption event of the second batch job within the job queue such that the second batch job executes until the second restart point is reached and terminates when the second restart point is reached; and
    restart the first batch job at the first restart point.

11. The computer readable medium of claim 1, wherein the indicator is a flag.

12. The computer readable medium of claim 1, the instructions comprising a portion of a batch job scheduler managing a plurality of job queues.

13. A computer implemented method for managing batch jobs, the method comprising:
    determining that a first batch job within a job queue is executing, wherein the first batch job includes one or more tasks, the first batch job comprising a business application injected with an interrupt framework;
    registering the business application via the interrupt framework, the registration comprising an indicator that is set at execution time via the framework;
    identifying a restart point that is placed at a predetermined location included by the first batch job prior to the first batch job executing;
    identifying, while the first batch job is executing, a second batch job to be executed;
    triggering an interruption event of the first batch job within the job queue;
    in response to the interruption event, continue a complete execution of a currently executing task for the first batch job without interruption until the restart point is reached and terminates when the restart point is reached;
    determining that the second batch job is executing when the first batch job has terminated; and
    restarting the first batch job at the restart point when the second batch job has executed.

14. The computer implemented method of claim 13, further comprising:
    receiving resuming data associated with the first batch job when the first batch job is interrupted, the resuming data comprising a batch job identifier and a restart point identifier;
    persisting the resuming data; and
    providing the resuming data from persistence to the first batch job when the first batch job is restarted.

15. The computer implemented method of claim 13, further comprising identifying the second batch job from among a plurality of batch jobs according to a job priority, the job priority selected from a job execution priority or an interrupt priority or both.

16. The computer implemented method of claim 13, wherein the second batch job is a higher priority batch job than the first batch job, and wherein the interruption event comprises an execution request of the higher priority batch job.

17. The computer implemented method of claim 13, wherein the second batch job includes a second restart point, and wherein the method further comprises:
    identifying a third batch job to be executed while the second batch job is executing;
    triggering a second interruption event of the second batch job within the job queue such that the second batch job executes until the second restart point is reached and terminates when the second restart point is reached;
    executing the third batch job when the second batch job has terminated; and
    restarting the second batch job at the second restart point when the third batch job has terminated.

18. The computer implemented method of claim 13, wherein the indicator is a flag.

\* \* \* \* \*